(12) United States Patent
Karg

(10) Patent No.: US 6,296,866 B2
(45) Date of Patent: *Oct. 2, 2001

(54) INSECT COMBATANT CONTROLLED/ PROLONGED DELIVERY DEVICE

(75) Inventor: Jörn E. Karg, Kaiserslautern (DE)

(73) Assignee: OMS Investments, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,718

(22) Filed: Jul. 8, 1999

Related U.S. Application Data

(62) Division of application No. 08/850,704, filed on May 2, 1997, now Pat. No. 5,948,423, which is a continuation of application No. 08/411,169, filed on Mar. 27, 1995, now Pat. No. 5,711,955, which is a continuation-in-part of application No. 08/234,417, filed on Apr. 28, 1994, now abandoned.

(30) Foreign Application Priority Data

Sep. 28, 1993 (FR) .................................................. 93 11762

(51) Int. Cl.⁷ .................................................. A01N 25/08
(52) U.S. Cl. .................. 424/409; 424/405; 424/413; 424/411; 424/416; 424/DIG. 10; 43/109.131; 514/919
(58) Field of Search .................. 424/405, 409–411, 424/413, 416, DIG. 10; 428/34.2, 519, 905, 907, 913; 43/109.131; 514/919

(56) References Cited

U.S. PATENT DOCUMENTS

| | | | | |
|---|---|---|---|---|
| 1,724,781 | * | 8/1929 | Smindez ................................. | 239/55 |
| 2,003,326 | * | 6/1935 | Wellman ................................. | 229/23 |
| 2,615,754 | * | 10/1952 | Lindenberg ............................ | 299/204 |
| 3,018,219 | * | 1/1962 | Jacobson ................................ | 424/84 |
| 3,279,118 | * | 10/1966 | Allen ...................................... | 43/129 |
| 3,324,590 | * | 6/1967 | Richardson ............................ | 43/131 |

(List continued on next page.)

FOREIGN PATENT DOCUMENTS

| | | |
|---|---|---|
| 0 019 010 | 11/1980 | (EP) . |
| 1 601 251 | 9/1970 | (FR) . |
| 2 075 314 | 9/1971 | (FR) . |
| 2 663 507 | 12/1991 | (FR) . |
| 2 252 462 | 10/1990 | (JP) . |

OTHER PUBLICATIONS

Derwent Publication for Japanese Patent No. 2,252,462, Oct. 1990.
Patent Abstract of Japanese Patent No. 2,252,462, vol. 14, No. 578, Oct. 1990.
Dardai et al. MU 49787–87.

*Primary Examiner*—Neil S. Levy
(74) *Attorney, Agent, or Firm*—Jones, Day, Reavis & Pogue

(57) ABSTRACT

Device for insecticidal treatment including a transparent plastic container in the form of a dish whose open face has a flat flange; a plastic sheet impervious to liquids and permeable to the vapors of essential oils at ambient temperature, this sheet being attached to the flat flange of the transparent container and adhering to this transparent container so as not to be capable of being grasped manually, and/or detached manually from the flat flange by pulling manually; a protective cover sheet (or film) made of adhesive plastic, also arranged on the face of the transparent container which is provided with flat flanges, this sheet adhering to the above permeable sheet by adhesive bonding and being capable of being grasped manually and/or being detached from the flat flange by pulling manually; and an insecticidal and/or insect repellent composition, this composition being liquid or capable of evaporating completely at ambient temperature and having an insecticidal and/or insect repellent activity in the vapor state.

32 Claims, 1 Drawing Sheet

U.S. PATENT DOCUMENTS

| | | |
|---|---|---|
| 3,655,129 * | 4/1972 | Seiner .................................... 239/60 |
| 3,767,785 * | 10/1973 | Bordenca ............................. 424/416 |
| 4,017,030 | 4/1977 | Coplan et al. . |
| 4,126,959 * | 11/1978 | Graham ................................. 43/136 |
| 4,157,787 | 6/1979 | Schwartz . |
| 4,158,440 | 6/1979 | Sullivan et al. . |
| 4,164,561 | 8/1979 | Hautmann . |
| 4,634,614 | 1/1987 | Holzner . |
| 4,845,131 | 7/1989 | Behrenz et al. . |
| 5,281,418 * | 1/1994 | Lindgren et al. .................... 424/405 |
| 5,281,621 * | 1/1994 | Wilson et al. ....................... 514/459 |
| 5,711,955 * | 1/1998 | Karg .................................... 424/409 |

* cited by examiner

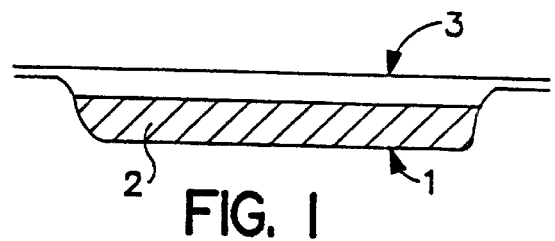
FIG. 1
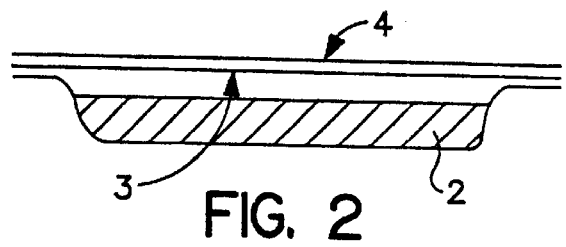
FIG. 2
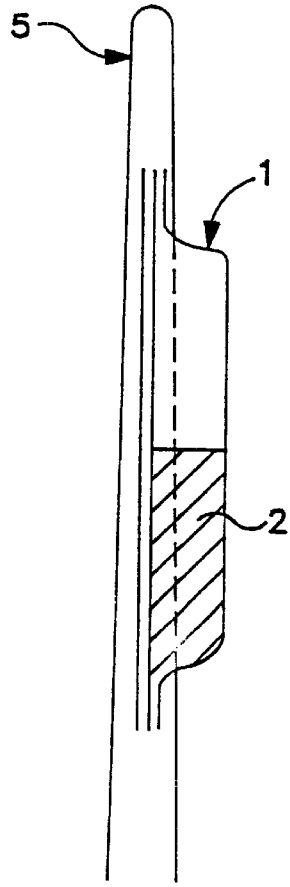
FIG. 3
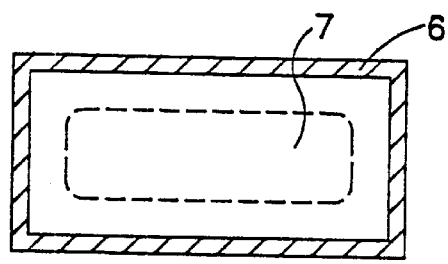
FIG. 4
FIG. 5A
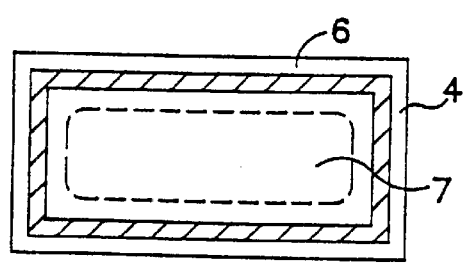
FIG. 5B

INSECT COMBATANT CONTROLLED/ PROLONGED DELIVERY DEVICE

CROSS-REFERENCE TO RELATED APPLICATIONS

The present application is a divisional of U.S. patent application Ser. No. 08/850,704, filed May 2, 1997, now allowed U.S. Pat. No. 5,948,423, which is a continuation of U.S. patent application Ser. No. 08/411,169, filed Mar. 27, 1995, now U.S. Pat. No. 5,711,955, which in turn is a continuation-in-part of U.S. patent application Ser. No. 08/234,417, filed Apr. 28, 1994, abandoned and claims the benefit of priority application French Patent Application No. 93 11762, filed Sep. 28, 1993. The contents of U.S. patent application Ser. No. 08/850,704, U.S. patent application Ser. No. 08/234,417 and priority French Patent Application No. 93 11762, are hereby incorporated by reference.

BACKGROUND OF THE INVENTION

1. Field of the Invention

The present invention relates to a new device which may be used for insecticidal and/or insect repellent treatment within human dwellings and, more particularly, for such treatments in confined spaces against clothes moths.

2. Description of the Prior Art

Articles for the release of volatile substances, such as deodorizers, insecticides, repellents and the like are known.

Hyman discloses, in U.S. Pat. No. 4,161,283, U.S. Pat. No. 4,285,468 and European Patent Application No. 0 019 010, devices formed from opposed outer and inner wall members joined along their peripheral portions to define a central reservoir portion for receiving and confining a volatile substance. The inner and outer wall members contain a liquid non-porous but gas permeable flexible polymeric sheet material having an impermeable barrier layer releasably bonded to the outer surfaces thereof.

Sullivan et al discloses, in U.S. Pat. No. 4,158,440, a device for releasing a volatile substance into the environment in a controlled manner. The device includes a permeable envelope portion having a greater affinity for the volatile substance than the reservoir material.

Hennart et al discloses, in French Patent Publication No. 2,075,314, an apparatus for the diffusion of insecticide. The apparatus is made by impregnating a fibrous substance with an insecticide solution and dipping it into a molten outer-layer mixture.

Hachiro discloses, in Japanese Patent Publication No. 2-252462, an apparatus for dissipating a volatile chemical. The apparatus includes storing volatile materials in separate chambers of thermoplastic synthetic resin.

Minier discloses, in French Patent Publication No. 2663507, discloses a parasite controlling device. The device comprises an element made of a wood having antiparasitic activity.

SUMMARY OF THE INVENTION

Accordingly, a major object of the present invention is the provision of a new device which can be used for insecticidal and/or insect repellent treatment within human dwellings and more particularly, for such treatments in confined spaces against moths.

The device according to the invention is characterized in that it includes:

a transparent plastic container in the form of a dish whose open face has a flat flange;

a plastic sheet (or membrane) impervious to liquids and permeable to vapors of essential oils at ambient temperature, this sheet being attached to a flat flange of the transparent container and adhering to this transparent container so as not to be capable of being grasped manually, and/or detached manually from the flat flange by pulling manually;

a protective cover sheet (or film) made of adhesive plastic, also arranged on the face of the transparent container which is provided with flat flanges, this sheet adhering to the above permeable sheet by adhesive bonding and being capable of being grasped manually and/or being detached from the flat flange by pulling manually;

an insecticidal and/or insect repellent composition, this composition being liquid or capable of evaporating completely at ambient temperature and having an insecticidal and/or insect repellent activity in the vapor state;

optionally, means for attaching and/or hanging the device and/or the transparent container; and optionally, a cardboard package folded in two, so as to contain within it the flat edges and the two permeable and protective sheets, the transparent dish being visible and transparent outside this cardboard package.

Other objects, aspects, and advantages of the present invention will be pointed out in or will be understood from the following detailed description provided below in conjunction with the accompanying drawings.

BRIEF DESCRIPTION OF THE DRAWINGS

FIG. 1 is a vertical cross-sectional view of an embodiment of the invention in its insecticidal and/or insect repellent functioning state without the cardboard package shown.

FIG. 2 is a vertical cross-sectional view of an embodiment of the invention in a state in which it is suitable for storage without the cardboard package shown.

FIG. 3 is a vertical cross-sectional view of an embodiment of the invention in a state in which it is suitable for storage, sale or use.

FIG. 4 is a horizontal cross-sectional view of an embodiment of the invention illustrating a protective sheet covering the device.

FIGS. 5a and 5b are horizontal cross-sectional views of embodiments of the invention where a cardboard package contains the device illustrated in FIG. 2.

DETAILED DESCRIPTION OF BEST MODE AND PREFERRED EMBODIMENTS OF THE INVENTION

More particularly according to the present invention, there is provided a new device for insecticidal treatment and method for its use in dwellings.

The device according to a preferred embodiment of the invention is characterized in that it includes:

a transparent plastic container in the form of a dish whose open face has a flat flange;

a plastic sheet (or membrane) impervious to liquids and permeable to vapors of essential oils at ambient temperature, this sheet being attached to a flat flange of the transparent container and adhering to this transparent container so as not to be capable of being grasped manually, and/or detached manually from the flat flange by pulling manually;

a protective cover sheet (or film) made of adhesive plastic, also arranged on the face of the transparent container which is provided with flat flanges, this sheet adhering to the above permeable sheet by adhesive bonding and being capable of being grasped manually and/or being detached from the flat flange by pulling manually;

an insecticidal and/or insect repellent composition, this composition being liquid or capable of evaporating completely at ambient temperature and having an insecticidal and/or insect repellent activity in the vapor state;

optionally, means for attaching and/or hanging the device and/or the transparent container; and optionally, a cardboard package folded in two, so as to contain within it the flat edges and the two permeable and protective sheets, the transparent dish being visible and transparent outside this cardboard package.

Examples of preferred embodiments of the devices according to the present invention are provided in FIGS. 1–5. More particularly, in FIG. 1, the transparent dish contains a liquid 2 and is covered with the permeable membrane 3. In addition to the insecticidal and/or repellent composition, the dish or transparent container may also contain a small quantity of air, for example, 1 to 10% by volume.

In FIG. 5, the cardboard package contains the device of FIG. 2 so that the flanges are inside. The cardboard package may act as an advertising display device. According to an alternative form of the invention this cardboard package comprises a cavity or a removable part allowing the protective film to be pulled out without detaching the transparent container from this cardboard package. This alternative form of the invention is particularly advantageous in that it makes it possible to leave the instructions concerning the method of use and the nature of the content of the device of the invention, so that they are visible on, the package of the device of the invention when it is in use and functioning. Such instructions are useful for the purpose of safety in use.

The device according to the invention is particularly suitable for confined spaces, especially in closed spaces of small volume such as the interior of pieces of furniture, wardrobes and cupboards. Although it can be employed against various type of insects, the device of the invention is particularly advantageous against clothes moths. The device according to the invention is therefore particularly advantageous for the protection of textiles in confined spaces, especially the protection of garments and furniture in dwellings such as flats or houses.

Another advantage of the device of the invention is that it makes it easily possible to choose the period of use (for example, 1 month, or 2 months, or 6 months or another) when the said device is manufactured. This period can thus be simply changed.

An advantage of the device according to the invention is that it is effective for a long period. In addition, when the insecticidal or repellent product is exhausted, the user has the possibility of very simply seeing and concluding that the transparent container is empty and must be replaced. Consequently, the insecticidal and/or repellent activity is maintained continuously and there is no intermediate period without any insecticide/repellent activity, and this is crucially important so as not to leave periods without insecticide/repellent during which the insects can again reproduce and develop and cause damage.

In the case of clothes moths, the invention is particularly advantageous in that it makes it possible to prevent damage to textiles, especially garments, during intermediate periods without any active substance.

The two sheets, one permeable and one protective, can adhere to the transparent container by adhesive bonding or by welding. Either way, this is done so that the adhesion of the permeable sheet is much stronger than the adhesion of the protective sheet, with the result that the protective sheet can be detached by pulling manually, while the permeable sheet cannot be detached by pulling manually. The difference in the adhesion can be obtained by either using the size of the area over which adhesion is present (and this is the preferable means), or using the nature of the adhesive.

FIG. 4 shows a top view of the device according to FIG. 1. The hatched part 4 shows the area where adhesion takes place between the transparent container 1 and the transparent sheet 3. The region 7 corresponds to the liquid 2 seen from above.

FIG. 5 shows a top view of the device according to FIG. 2. The hatched part shows the area 6 where the adhesion takes place between the transparent container 1 and the transparent sheet 3. Two illustrations have been made, according to whether the protective sheet 4 does or does not overlap the permeable membrane 3.

The insecticidal and/or repellent liquid compositions are advantageously compositions containing generally from 20 to 85%, and preferably from 40 to 75%, of essential oils, and from 15 to 80%, and preferably from 25 to 60%, of an evaporation agent (or diffusion agent).

Examples of essential oils include cedar foliage essence, thuya essence, lavender essence, lavandin essence, lemon tree essence, Litsea cubeba essence and Verty essence. Preferred essential oils usable according to the invention are cedar foliage essence and lavender essence.

The evaporation agent or diffusion agent usable according to the invention, can be one of the constituents of the essential oil. Preferably, the evaporation agent is a liquid which has a rate of evaporation at least two times higher, and preferably more than three times higher, than the rate of evaporation of the main active substance. This evaporation agent is advantageously miscible with the main active substance. More preferably, this evaporation agent or diffusion agent is one of the following compounds: hexyl acetate (and preferably n-hexyl acetate), isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene (or terpene essence derived of orange), allyl heptanoate, methyl hexeoate, ethyl isobutyrate, methyl pentylketone, myrcene, phaellandrene, pinene, butyl valerianate, terpinolene, and paraffin oils (saturated hydrocarbons liquids at ambient temperature). The evaporation agent or diffusion agent can be used straight or in mixture. The evaporation agent or diffusion agents, listed herein above, have a remarkable efficacy when they are used in mixture with essential oils.

The liquid insecticidal and/or repellent compositions according to the invention may also contain dying agents in a quantity preferably below 1%. They also may contain various aromatic compounds such as substances derivating from vanillin such as ethyl vanillin, coumarin, santal wood essence, terpinyl acetate, citral delphens and turpentine essence. These compounds may constitute from 2 to 40% of the compositions according to the invention.

The transparent containers are advantageously made of polymeric material such as polyethylene or polypropylene or their copolymers. The thickness of the material is sufficient to prevent any permeation either of the liquid or of its vapor. The effective volume of the container is generally between 2 and 120 $cm^3$.

The nature and the thickness of the permeable membrane or permeable sheet are chosen so as to exhibit the permeability characteristics indicated above.

Advantageously, the polymeric membrane chosen must satisfy the following test: A container full of 10 g of cedar wood essence is provided with a free face applied against a vertical membrane, on a surface of 14 cm². The membrane allows 0.8 g of the oil to evaporate after 6 months.

Membranes which are particularly suitable for the purpose of the invention are membrane made of polymeric materials, such as high density polyethylene with a thickness of 50 to 300 microns. The area used for the permeation is generally between 5 and 35 cm².

The protective sheets or membranes are advantageously made of polymeric material such as polypropylene. They are provided with an adhesive bonding agent capable of not damaging the permeable membrane when the protective sheet is detached from this membrane.

In order to further illustrate the present invention and the advantages thereof, the following specific examples are given, it being understood that same are intended only as illustrative and in nowise limitative.

EXAMPLE 1

A container in the shape of a dish 8 mm in depth contained 10 g of a mixture comprising 55% by weight cedar wood essence, 5% cedar foliage essence, 10% isobornyl acetate (diffusion agent), 10% terpene essence derived from orange (diffusion agent), 5% turpentine essence, 5% phaellandrene (diffusion agent), 15% benzyl acetate,(diffusion agent). All the adjuvants in this composition had a rate of evaporation which was more than 3 times higher than that of the cedar wood essence.

This container was made of semi-rigid and transparent polypropylene 0.5 mm thick. On the flat flange of this transparent container, there was a permeable membrane of 200 micron high density polyethylene whose effective area for the permeation (equal to the area of the opening of the transparent container) was 14 cm².

The device was produced in a form as described in the drawings attached to the present description.

The protective sheet was made of 280 micron polypropylene and was provided with an adhesive. One corner of this protective layer was left without adhesive so that this layer could be grasped manually.

This device was hung in a confined space of 1 m³ for 3 months. At the end of the 3 months, 9 g of the mixture was seen to have disappeared.

This result can be compared with the results of the same test made with cedar wood essence without use of a diffusion agent. In this case, 0.8 g of the mixture was seen to have disappeared.

At the beginning of the three months, garments were hung in the confined space, and the device, as described above, was hung, and then clothes moths larvae was deposited in 3 separate places of the hanging garments.

At the end of the 3 months, it was seen that the garments did not sustained any damage, the larvae were dead, and there was no chrysalis nor any other form of insect in any stage of development of the clothes moth life cycle.

EXAMPLE 2

The procedure of Example 1 was repeated, but using a container containing 10% lavender essence, 33% lavandin essence, 22% linalyle acetate (diffusion agent), 30% limonene, 5% of isononyl acetate (diffusion agent).

The results obtained were similar to those of Example 1.

EXAMPLE 3

The procedure of Example 1 was repeated, but using a container containing 5% metadelphene, 20% lemon tree essence, 25% citral, 10% paraffinic oil (diffusion agent), 5% limonene (diffusion agent), and 35% terpinyl acetate.

The results obtained were similar to those of Example 1.

EXAMPLE 4

The procedure of Example 1 was repeated, but using a container containing 40% cedar wood essence, 5% cedar foliage essence, 20% isononyle acetate (diffusion agent), 2% ethylvanillin, 2% coumarin, 15% phaellandrene (diffusion agent), 16% santal wood essence.

The results obtained were similar to those of Example 1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A device suitable for combating insects, comprising:
   a transparent plastic container in the form of a dish whose open face has a flat flange, the container having an effective volume between 2 and 120 cm³ and an effective area for permeation between 5 and 35 cm²;
   a plastic sheet or membrane made of polyethylene, impervious to liquids and permeable to the vapors of essential oils at ambient temperature, wherein said vapors are emanated from a liquid insecticidal and/or insect repellant composition contained in the plastic container, said plastic sheet or membrane having a thickness of 50 to 300 microns, said sheet or membrane being attached to said flat flange of the transparent container and adhering to said transparent container;
   a protective cover sheet made of adhesive polyethylene and/or polypropylene, impervious to liquids and to the vapors of essential oils at ambient temperature, also arranged on the face of the transparent container, said cover sheet adhering to the permeable sheet by adhesive bonding; and
   said insecticidal and/or insect repellent composition being a liquid capable of evaporating completely at ambient temperature and having an insecticidal and/or insect repellent activity in the vapor state, and containing an essential oil selected from the group consisting of cedar wood essence, cedar foliage essence, thuya essence, lavender essence, lavandin essence, lemon tree essence, Litsea cubeba essence, Verty essence and mixtures thereof as well as a diffusion or evaporation agent, wherein the liquid insecticidal and/or repellent composition contains 20 to 85% of one or more essential oils, 15 to 80% of a diffusion or evaporation agent, and optionally 2 to 40% of an aromatic compound.

2. A device according to claim 1, further comprising means for attaching and/or hanging the device.

3. A device according to claim 1, further comprising a cardboard package folded in two, so as to contain within it the flat edges and the two permeable and protective sheets, the transparent dish being visible and transparent outside this cardboard package.

4. A device according to claim 1 wherein the cardboard package comprises a cavity or a detachable part allowing the protective film to be pulled off without detaching the transparent container from this cardboard package.

5. A device according to claim 1, wherein said composition is active in destroying or repelling clothes moths.

6. A device according to claim 1, wherein the liquid insecticidal and/or repellent composition contains 40 to 75% of said essential oils.

7. A device according to claim 1, wherein the essential oil is cedar wood essence or lavender essence.

8. A device according to claim 1, wherein the diffusion or evaporation agent is a liquid agent miscible with the main active compound and has a rate of evaporation at least two times higher than the rate of evaporation of the main active substance.

9. A device according to claim 8, wherein said rate of evaporation of said diffusion or evaporation agent is at least three times higher than the rate of evaporation of the main active substance.

10. A device according to claim 1, wherein the diffusion or evaporation agent is hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene (or terpene essence derived of orange), allyl heptanoate, methyl hexeoate, ethyl isobutyrate, methyl pentylketone, myrcene, phaellandrene, pinene, butyl valerianate, terpinolene, and paraffin oils or mixtures thereof.

11. A device according to claim 1, wherein the membrane is a polymeric membrane that will permit 0.8 g of the oil to evaporate after six months when said container is filled with 10 g of cedar wood essence, provided with a free face applied against a vertical membrane to provide an effective area for permeation of 14 $cm^2$.

12. A regime for combatting or controlling insects, comprising placing the device according to claim 1 in close proximity to textiles, garments or furniture for a prolonged period to repel said insects.

13. The regime of combatting or controlling insects according to claim 12, comprising placing said device in close proximity to said textiles, garments or furniture until empty, and then placing a second device in close proximity to said textiles, garments or furniture without a period of interruption of protection.

14. A device according to claim 1, further comprising non-adhesive means for attaching and/or hanging the device.

15. A device for combating insects, comprising:
   a transparent plastic container in the form of a dish whose open face has a flat flange;
   a plastic sheet or membrane impervious to liquids and permeable to the vapors of essential oils at ambient temperature, wherein said vapors are emanated from a liquid insecticidal and/or repellant composition contained in the plastic container, said sheet or membrane being attached to said flat flange of the transparent container and adhering to said transparent container, said sheet or membrane having an effective area of permeation between 5 and 35 $cm^2$ and a thickness and a permeability effective to maintain insecticidal and/or repellant activity for a period of one month to six months;
   a protective cover sheet made of a plastic material which is impervious to liquids and to the vapors of essential oils at ambient temperature, also arranged on the face of the transparent container, said cover sheet adhering to the permeable sheet by adhesive bonding;
   said insecticidal and/or insect repellent composition being a liquid capable of evaporating completely at ambient temperature and having an insecticidal and/or insect repellent activity in the vapor state, and containing 20 to 85% of one or more essential oils selected from the group consisting of cedar wood essence, lavender essence, cedar foliage essence, thuya essence, lavandin essence, lemon tree essence, Litsea cubeba essence, Verty essence and mixtures thereof, 15 to 80% of a diffusion or evaporation agent in the form of a liquid chemical, miscible with said essential oil and having a rate of evaporation at least two times higher than the rate of evaporation of said essential oil, and 2 to 40% of an aromatic compound;
   non-adhesive means for attaching and/or hanging the device; and
   said container having an effective volume between 2 and 120 $cm^3$.

16. A device according to claim 15, wherein said composition is active in destroying or repelling clothes moths.

17. A device according to claim 15, wherein the liquid insecticidal and/or repellent composition contains 40 to 75% of said essential oils.

18. A device according to claim 15, wherein the liquid insecticidal and/or repellent composition contains 25 to 60% of said diffusion or evaporation agent.

19. A device according to claim 15, wherein the essential oil is cedar wood essence or lavender essence.

20. A device according to claim 15, wherein said rate of evaporation of said diffusion or evaporation agent is at least three times higher than the rate of evaporation of the main active substance.

21. A device according to claim 15, wherein the diffusion or evaporation agent is hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene, terpene essence derived of orange, allyl heptanoate, methyl hexeoate, ethyl isobutyrate, methyl pentylketone, myrcene, phaellandrene, pinene, butyl valerianate, terpinolene, and paraffin oils or mixtures thereof.

22. A device according to claim 15, wherein the membrane is a polymeric membrane that will permit 0.8 g of the oil to evaporate after six months when said container is filled with 10 g of cedar wood essence, provided with a free face applied against a vertical membrane to provide an effective area for permeation of 14 $cm^2$.

23. A device according to claim 15, wherein the thickness of the permeable membrane is 50 to 300 microns.

24. A device according to claim 15, wherein the permeable membrane is made of polyethylene.

25. A regime for combating or controlling insects, comprising placing the device according to claim 15 in close proximity to textiles, garments or furniture for a prolonged period to repel said insects.

26. The regime of combating or controlling insects according to claim 25, comprising placing said device in close proximity to said textiles, garments or furniture until empty, and then placing a second device in close proximity to said textiles, garments or furniture without a period of interruption of protection.

27. A device according to claim 15, wherein the thickness of the permeable membrane is 50 to 300 microns, and the diffusion or evaporation agent is hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene, terpene essence derived of orange, allyl heptanoate, methyl hexeoate, ethyl isobutyrate, methyl pentylketone, myrcene, phaellandrene, pinene, butyl valerianate, terpinolene, and paraffin oils or mixtures thereof.

28. A device for combating insects, comprising:
   a transparent plastic container in the form of a dish whose open face has a flat flange;

a plastic sheet or membrane impervious to liquids and permeable to the vapors of essential oils at ambient temperature, said sheet or membrane being attached to said flat flange of the transparent container and adhering to said transparent container;

a protective cover sheet made of polypropylene, impervious to liquids and to the vapors of essential oils at ambient temperature, also arranged on the face of the transparent container, said cover sheet adhering to the permeable sheet by adhesive bonding;

an insecticidal and/or insect repellent composition contained in the plastic container, said composition being a liquid capable of evaporating completely at ambient temperature and having an insecticidal and/or insect repellent activity in the vapor state, and containing an essential oil selected from cedar wood essence, cedar foliage essence, thuya essence, lavender essence, lavandin essence, lemon tree essence, Litsea cubeba essence, Verty essence and mixtures thereof, and a diffusion or evaporation agent in the form of a liquid chemical selected from hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene, terpene essence derived of orange, allyl heptanoate, methyl hexeoate, ethyl isobutyrate, methyl pentylketone, myrcene, phaellandrene, pinene, butyl valerianate, terpinolene, paraffin oils, and mixtures thereof;

non-adhesive means for attaching and/or hanging the device; and wherein said container has an effective volume between 2 and 120 cm$^3$, and wherein the sheet or membrane is a polymeric membrane having a thickness of 50 to 300 microns that will permit 0.8 g of the oil to evaporate after six months when said container is filled with 10 g of cedar wood essence and with a free face applied against a vertical membrane to provide an effective area for permeation of 14 cm$^2$.

29. A device according to claim 28, wherein the permeable membrane is made of polyethylene.

30. A device for combating insects, comprising:

a transparent plastic container in the form of a dish whose open face has a flat flange;

a plastic sheet or membrane impervious to liquids and permeable to the vapors of essential oils at ambient temperature, wherein said vapors are emanated from a liquid insecticidal and/or insect repellant composition contained in the plastic container, said sheet or membrane being attached to said flat flange of the transparent container and adhering to said transparent container, said sheet or membrane having an effective area of permeation between 5 and 35 cm$^2$ and a thickness and a permeability effective to maintain insecticidal and/or repellant activity for a period of one month to six months;

a protective cover sheet made of polypropylene, impervious to liquids and to the vapors of essential oils at ambient temperature, also arranged on the face of the transparent container, said cover sheet adhering to the permeable sheet by adhesive bonding;

said insecticidal and/or insect repellent composition being a liquid capable of evaporating completely at ambient temperature and having an insecticidal and/or insect repellent activity in the vapor state, and containing 20 to 85% of one or more essential oils selected from the group consisting of cedar wood essence, cedar foliage essence, thuya essence, lavender essence, lavandin essence, lemon tree essence, Litsea cubeba essence, Verty essence and mixtures thereof, 15 to 80% of a diffusion or evaporation agent in the form of a liquid chemical, miscible with said essential oil and having a rate of evaporation at least two times higher than the rate of evaporation of said essential oil, and 2 to 40% of an aromatic compound, wherein the diffusion or evaporation agent is hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene, terpene essence derived of orange, allyl heptanoate, methyl hexeoate, ethyl isobutyrate, methyl pentylketone, myrcene, phaellandrene, pinene, butyl valerianate, terpinolene, and paraffin oils or mixtures thereof;

non-adhesive means for attaching and/or hanging the device; and said container having an effective volume between 2 and 120 cm$^3$.

31. A device for combating insects, comprising:

a transparent plastic container in the form of a dish whose open face has a flat flange;

a plastic sheet or membrane impervious to liquids and permeable to the vapors of essential oils at ambient temperature, wherein said vapors are emanated from a liquid insecticidal and/or insect repellant composition contained in the plastic container, said sheet or membrane being attached to said flat flange of the transparent container and adhering to said transparent container, said sheet or membrane having an effective area of permeation between 5 and 35 cm$^2$ and a thickness and a permeability effective to maintain insecticidal and/or repellant activity for a period of one month to six months;

a protective cover sheet made of a plastic material which is impervious to liquids and to the vapors of essential oils at ambient temperature, also arranged on the face of the transparent container, said cover sheet adhering to the permeable sheet by adhesive bonding;

said insecticidal and/or insect repellent composition being a liquid capable of evaporating completely at ambient temperature and having an insecticidal and/or insect repellent activity in the vapor state, and containing 20 to 85% of one or more essential oils selected from the group consisting of cedar wood essence, cedar foliage essence, thuya essence, lavender essence, lavandin essence, lemon tree essence, Litsea cubeba essence, Verty essence and mixtures thereof, 15 to 80% of a diffusion or evaporation agent in the form of a liquid chemical, miscible with said essential oil and having a rate of evaporation at least two times higher than the rate of evaporation of said essential oil, and 2 to 40% of an aromatic compound;

non-adhesive means for attaching and/or hanging the device;

said container having an effective volume between 2 and 120 cm$^3$;

wherein the membrane is a polymeric membrane that will permit 0.8 g of the oil to evaporate after six months when said container is filled with 10 g of cedar wood essence, provided with a free face applied against a vertical membrane to provide an effective area for permeation of 14 cm$^2$.

32. A device for combating insects, comprising:

a transparent plastic container in the form of a dish whose open face has a flat flange;

a plastic sheet or membrane impervious to liquids and permeable to the vapors of essential oils at ambient temperature, wherein said vapors are emanated from a liquid insecticidal and/or insect repellant composition contained in the plastic container, said sheet or membrane being attached to said flat flange of the transparent container and adhering to said transparent container, said sheet or membrane having an effective area of permeation between 5 and 35 cm$^2$ and a thickness and a permeability effective to maintain insecticidal and/or repellant activity for a period of one month to six months;

a protective cover sheet made of polypropylene, impervious to liquids and to the vapors of essential oils at ambient temperature, also arranged on the face of the transparent container, said cover sheet adhering to the permeable sheet by adhesive bonding;

said insecticidal and/or insect repellent composition being a liquid capable of evaporating completely at ambient temperature and having an insecticidal and/or insect repellent activity in the vapor state, and containing 20 to 85% of one or more essential oils selected from the group consisting of cedar wood essence, cedar foliage essence, thuya essence, lavender essence, lavandin essence, lemon tree essence, Litsea cubeba essence, Verty essence and mixtures thereof, 15 to 80% of a diffusion or evaporation agent in the form of a liquid chemical, miscible with said essential oil and having a rate of evaporation at least two times higher than the rate of evaporation of said essential oil, wherein the thickness of the permeable membrane is 50 to 300 microns, and the diffusion or evaporation agent is hexyl acetate, isobutyl acetate, cyclohexyl acetate, prenyl acetate, isononyl acetate, isobornyl acetate, linalyl acetate, benzyl acetate, ethyl butyrate, camphor, ethyl caproate, methyl caproate, carene, limonene, terpene essence derived of orange, allyl heptanoate, methyl hexeoate, ethyl isobutyrate, methyl pentylketone, myrcene, phaellandrene, pinene, butyl valerianate, terpinolene, and paraffin oils or mixtures thereof, and 2 to 40% of an aromatic compound;

non-adhesive means for attaching and/or hanging the device; and said container having an effective volume between 2 and 120 cm$^3$.

* * * * *